Patented June 6, 1939

2,161,558

UNITED STATES PATENT OFFICE 2,161,558

ETHERS OF TERTIARY-ALKYL PHENYLPHENOLS

Gerald H. Coleman and Garnett V. Moore, Midland, Mich., assignors to The Dow Chemical Company, Midland, Mich., a corporation of Michigan No Drawing. Application May 31, 1938, Serial No. 211,025

8 Claims. (Cl. 260—612)

The present invention concerns alkyl ethers of alkylated phenylphenols in which at least one tertiary-alkyl group is substituted in the oxygenated benzene ring.

We have found that the alkyl ethers of the tertiary-alkyl-phenylphenols are viscous, water-white liquids or low-melting solids having utility as plasticizers, solubilizing agents, lubricants, insecticides, and intermediates. These compounds are substantially insoluble in water, soluble in most common organic solvents, resistant to decomposition by heat and discoloration by light, and characterized by high boiling points and low volatilities.

The invention, then, consists in the new compounds and compositions comprising the same hereinafter described and particularly pointed out in the claims.

The ethers of the tertiary-alkyl-phenylphenols may be prepared by heating an alcoholic or aqueous alcoholic solution of an alkali metal tertiary-alkyl-phenylphenolate with an alkyl halide to a temperature at which reaction occurs, and thereafter separating the desired ether product from the reacted mixture as by fractional distillation, etc. The tertiary-alkyl-phenylphenolate and alkyl halide may be employed in any desired proportions, although we generally employ a slight molecular excess of alkyl halide. While the process can be carried out by refluxing the phenolate solution and alkyl halide mixture under atmospheric pressure, we generally prefer to introduce the reactants into a suitable pressure reactor equipped with means for agitation and thereafter to carry out the reaction at temperatures between about 100° and 180° C. and under autogenous pressure. The etherification is ordinarily complete in from 1 to 6 hours, after which the reacted mixture is diluted with water to separate out the crude ether product as an immiscible oil. This oil is separated and washed with an aqueous-alcoholic solution of potassium or sodium hydroxide to recover unreacted phenols, and the residue from the extraction thereafter washed with water, dried, and fractionally distilled under reduced pressure to obtain the desired ethers in substantially pure form.

The tertiary-alkyl-phenylphenols employed in the reaction may be prepared by the condensation of tertiary-alkyl olefines, halides or alcohols, with the phenylphenols in the presence of a suitable Friedel Crafts catalyst substantially as described in United States application Serial No. 78,640, filed May 8, 1936, for "Branched-chain alkyl-phenylphenols". In preparing tertiary-alkyl substituted phenylphenols according to this method, the reaction is conveniently carried out in the liquid phase in the presence of the catalyst, slowly adding the olefine, halide, or alcohol below the surface of the molten phenolic reaction mixture with stirring, and thereafter heating and stirring the reaction mixture until the condensation is complete. The reaction temperature is usually between about 75° and 175° C., although higher temperatures may be employed. If desired, the reactants may be dispersed in an inert solvent, e. g. carbon tetrachloride, ethylenechloride, etc., in which case the use of somewhat lower reaction temperatures is practicable. After the reaction is completed, the crude alkylated mixture is washed with dilute aqueous hydrochloric acid to decompose and remove residual catalyst, and the tertiary-alkyl-phenylphenol separated as by fractional distillation in vacuo. In place of the phenylphenols, mono-alkyl phenylphenols may also be employed as starting materials in the reaction.

The term "tertiary-alkyl-phenylphenols" as employed in the specification and claims of this application includes poly-alkyl-phenylphenols in which all of the alkyl groups are not tertiary in configuration, provided only that at least one tertiary-alkyl radical be attached to the hydroxylated benzene ring of the phenylphenol nucleus. Included also within the scope of the invention are ethers of those phenylphenol compounds containing halogen substituents in the oxygenated benzene ring as well as the tertiary-alkyl group.

The following examples describe the preparation of certain of our new ether compounds, but are not to be construed as limiting the invention:

EXAMPLE 1

*Normal-butyl ether of 4-tertiary-butyl-6-phenylphenol*

113 grams (0.5 mol) of 4-tertiary-butyl-6-phenylphenol was dissolved in 100 milliliters of methyl alcohol and a solution of 20 grams (0.5 mol) of sodium hydroxide in 20 milliliters of water and 50 milliliters of methyl alcohol added thereto to form an aqueous alcoholic solution of sodium 4-tertiary-butyl-6-phenylphenolate. This solution was poured into a pressure reactor equipped with an aqueous alcoholic solution of potassium of normal-butyl chloride added thereto. The reactor was sealed and heated at 125° C. for 2 hours, at the end of which time the reacted mixture was removed and diluted with 200 milliliters of water. The water-immiscible oil which separated out was taken up in diethyl ether and washed with an aqueous alcoholic solution of potassium hydroxide to remove traces of unreacted 4-tertiary-butyl-6-phenylphenol. The ether solution was then dried and fractionally distilled under reduced pressure, whereby there was obtained 104.5 grams (0.371 mol) of the normal-butyl ether of 4-tertiary-butyl-6-phenylphenol as a colorless oil boiling at 157°–159° C. at 3 millimeters pressure, and having a specific gravity of 0.979 at 20°/4° C.

EXAMPLE 2

*Isopropyl ether of 3-phenyl-4-tertiary-butyl phenol*

In a similar manner, 0.5 mol of sodium-3-phenyl-4-tertiary-butyl phenolate was reacted with approximately 0.75 mol of isopropyl chloride, whereby there was obtained the isopropyl ether of 3-phenyl-4-tertiary-butyl phenol as a colorless, viscous oil boiling at 164°–168° C. at 3 millimeters pressure, and having the specific gravity 0.990 at 20°/4° C.

In a similar manner, other tertiary-alkyl phenyl-phenols, tertiary-alkyl-halo-phenylphenols, and poly-alkyl phenylphenols containing at least one tertiary-alkyl group attached to the hydroxylated benzene nucleus were reacted with various alkyl halides to produce compounds of which the following are representative:

The ethyl ether of 2,4-di-tertiary-butyl-6-phenyl-phenol, a thick, viscous oil boiling at 176°–179° C. at 4 millimeters pressure, and having a specific gravity of 0.973 at 20°/4° C. On standing, this compound showed a tendency to crystallize.

The ethyl ether of 4-tertiary-hexyl-6-phenylphenol, a colorless oil boiling at 150°–153° C. at 3 millimeters pressure, and having the specific gravity 0.988 at 20°/4° C.

The ethyl ether of 4-tertiary-amyl-6-phenyl-phenol, a water-white, sirupy liquid boiling at 145°–149° C. at 3 millimeters pressure, and having a specific gravity of 0.996 at 20°/4° C.

The ethyl ether of 4-tertiary-butyl-6-phenyl-phenol, a mobile, colorless liquid boiling at 140°–144° C. at 3 millimeters pressure, and having a specific gravity of 1.00 at 20°/4° C.

The normal-amyl ether of 4-tertiary-butyl-6-phenylphenol, a viscous, water-white liquid boiling at 174°–177° C. at 4 millimeters pressure, and having a specific gravity of 0.972 at 20°/4° C.

Other ether compounds which can be prepared in a like manner by reacting together alkyl halides and tertiary-alkylated phenylphenols other than those shown in the examples include methyl ether of 4-tertiary-butyl-6-phenylphenol, ethyl ether of 4-tertiary-octyl-6-phenylphenol, ethyl ether of 2-chloro-4-tertiary-butyl-6-phenylphenol, ethyl ether of 2-bromo-4-tertiary-amyl-6-phenylphenol, ethyl ether of 2-tertiary-butyl-6-phenylphenol, ethyl ether of 2-methyl-4-tertiary-butyl-6-phenylphenol, ethyl ether of 2-tertiary-butyl-4-phenylphenol, ethyl ether of tertiary-butyl-mono-iodo-6-phenylphenol, isobutyl ether of 2-tertiary-amyl-5-phenylphenol, secondary-amyl ether of 4-tertiary-octyl-6-phenylphenol, normal-octyl ether of 4-tertiary-butyl-6-phenylphenol, tertiary-butyl ether of 4-tertiary-butyl-6-phenylphenol, and the like.

Certain of the compounds described in the foregoing examples have been tested by the Peet-Grady method (Soap, 8, No. 4, 1932) and found to be particularly valuable as fly toxics. For example, a 3 per cent solution of the ethyl ether of 4-tertiary-butyl-6-phenylphenol in kerosene, when tested against house flies, was found to give an excess of an 80 per cent knockdown within ten minutes. The ethers were also found to have utility as plasticizers and modifying agents for polystyrene and cellulose ether plastic compositions.

Other modes of applying the principle of our invention may be employed instead of those explained, change being made as regards the materials employed, provided the products described in the following claims be thereby obtained.

We therefore particularly point out and distinctly claim as our invention:

1. An alkyl ether of an alklated phenylphenol wherein at least one tertiary-alkyl radical is attached to the oxygenated benzene ring.

2. An alkyl ether of an alkylated phenylphenol wherein at least one tertiary-alkyl radical is attached to the oxygenated benzene ring, and each such alkyl group contains not more than 8 carbon atoms.

3. An ethyl ether of an alkylated phenylphenol wherein at least one tertiary-alkyl radical is attached to the oxygenated benzene ring.

4. A compound having the formula

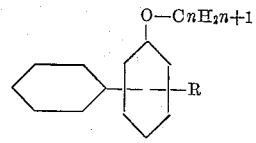

wherein R represents a tertiary-alkyl group, and $n$ represents an integer.

5. A compound having the formula

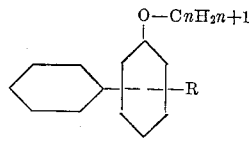

wherein R represents a tertiary-alkyl group containing from 4 to 8 carbon atoms, inclusive, and $n$ represents an integer from 1 to 8, inclusive.

6. A compound having the formula

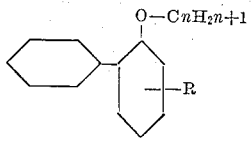

wherein R represents a tertiary-alkyl group containing from 4 to 8 carbon atoms, inclusive, and $n$ represents an integer from 1 to 8, inclusive, 7. A compound having the formula

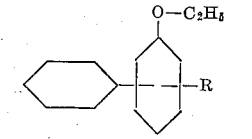

wherein R represents a tertiary-alkyl group containing from 4 to 8 carbon atoms, inclusive.

8. A compound having the formula

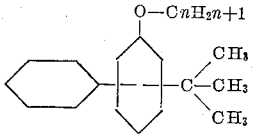

wherein $n$ represents an integer from 1 to 8, inclusive.

GERALD H. COLEMAN.
GARNETT V. MOORE.

CERTIFICATE OF CORRECTION.

Patent No. 2,161,558. June 6, 1939.

GERALD H. COLEMAN, ET AL.

It is hereby certified that error appears in the printed specification of the above numbered patent requiring correction as follows: Page 1, second column, line 48, for the words "an aqueous alcoholic solution of potassium" read means for agitation and 46.3 grams (0.5 mol); and that the said Letters Patent should be read with this correction therein that the same may conform to the record of the case in the Patent Office.

Signed and sealed this 19th day of September, A. D. 1939.

(Seal)

Henry Van Arsdale,
Acting Commissioner of Patents.